(12) United States Patent
Sheng et al.

(10) Patent No.: US 9,513,727 B2
(45) Date of Patent: Dec. 6, 2016

(54) TOUCH INPUT SURFACE MICROPHONE

(71) Applicant: Sentons Inc., Grand Cayman (KY)

(72) Inventors: Samuel W. Sheng, Saratoga, CA (US);
Shih-Ming Shih, San Jose, CA (US);
Lapoe E. Lynn, Los Altos, CA (US)

(73) Assignee: Sentons Inc. (KY)

( * ) Notice: Subject to any disclaimer, the term of this patent is extended or adjusted under 35 U.S.C. 154(b) by 281 days.

(21) Appl. No.: 13/828,666

(22) Filed: Mar. 14, 2013

(65) Prior Publication Data

US 2014/0023210 A1    Jan. 23, 2014

Related U.S. Application Data

(60) Provisional application No. 61/673,101, filed on Jul. 18, 2012.

(51) Int. Cl.
| | | |
|---|---|---|
| *H04R 7/04* | (2006.01) | |
| *G06F 3/041* | (2006.01) | |
| *H04R 17/00* | (2006.01) | |
| *H04R 3/00* | (2006.01) | |
| *G06F 3/043* | (2006.01) | |
| *H04R 1/00* | (2006.01) | |

(Continued)

(52) U.S. Cl.
CPC ............ *G06F 3/041* (2013.01); *G06F 3/043* (2013.01); *G06F 3/0416* (2013.01); *G06F 3/0418* (2013.01); *G06F 3/0436* (2013.01); *H04R 1/00* (2013.01); *H04R 3/00* (2013.01); *H04R 7/045* (2013.01); *H04R 17/00* (2013.01); *H04R 29/00* (2013.01); *G06F 2203/04103* (2013.01); *G06F 2203/04104* (2013.01); *H04R 9/066* (2013.01); *H04R 2499/15* (2013.01)

(58) Field of Classification Search
CPC ....... H04R 3/00; H04R 17/00; H04R 2499/15; H04R 7/045; H04R 17/02; H04R 7/04; H04R 2201/401; H04R 1/00; H04R 29/00; H04R 29/004; H04R 29/005; H04R 7/06; H04R 7/08; H04R 7/10; H04R 9/066; G06F 3/043; G06F 3/0433; G06F 3/0436; G06F 3/0418; G06F 3/041; G06F 3/0416; G06F 2203/04103; G06F 2203/04104
USPC ................ 381/355, 365, 173, 190, 152, 114, 122,381/94.1, 94.5, 94.7; 345/173, 175, 177
See application file for complete search history.

(56) References Cited

U.S. PATENT DOCUMENTS

| | | | |
|---|---|---|---|
| 4,594,695 A | * | 6/1986 | Garconnat et al. ........... 367/135 |
| 5,739,479 A | | 4/1998 | Davis-Cannon et al. |
| 5,784,054 A | | 7/1998 | Armstrong et al. |

(Continued)

FOREIGN PATENT DOCUMENTS

WO          03005292          1/2003

OTHER PUBLICATIONS

T. Benedict et al. "The joint estimation of signal and noise from the sum envelope." IEEE Transactions on Information Theory 13.3, pp.447-454. Jul. 1, 1967.

*Primary Examiner* — Vivian Chin
*Assistant Examiner* — Jason R Kurr
(74) *Attorney, Agent, or Firm* — Van Pelt, Yi & James LLP

(57) ABSTRACT

Processing an audio signal is disclosed. The audio signal is received from a sensor coupled to a touch input medium. An indication of an event where the touch input medium has been contacted at a location on the touch input medium is received. The event has been captured as an audio signal (Continued)

component of the received audio signal. At least a portion of the audio signal component is reduced from the audio signal.

20 Claims, 14 Drawing Sheets

(51) Int. Cl.
*H04R 29/00* (2006.01)
*H04R 9/06* (2006.01)

(56) References Cited

U.S. PATENT DOCUMENTS

| | | | |
|---|---|---|---|
| 5,883,457 | A | 3/1999 | Rinde et al. |
| 6,091,406 | A | 7/2000 | Kambara et al. |
| 6,254,105 | B1 | 7/2001 | Rinde et al. |
| 6,307,942 | B1* | 10/2001 | Azima et al. ............ 381/152 |
| 6,473,075 | B1 | 10/2002 | Gomes et al. |
| 6,535,147 | B1 | 3/2003 | Masters et al. |
| 6,567,077 | B2 | 5/2003 | Inoue et al. |
| 6,630,929 | B1 | 10/2003 | Adler et al. |
| 6,636,201 | B1 | 10/2003 | Gomes et al. |
| 6,856,259 | B1 | 2/2005 | Sharp |
| 6,891,527 | B1 | 5/2005 | Chapman et al. |
| 6,948,371 | B2 | 9/2005 | Tanaka et al. |
| 7,000,474 | B2 | 2/2006 | Kent |
| 7,006,081 | B2 | 2/2006 | Kent et al. |
| 7,116,315 | B2 | 10/2006 | Sharp et al. |
| 7,119,800 | B2 | 10/2006 | Kent et al. |
| 7,187,369 | B1 | 3/2007 | Kanbara et al. |
| 7,193,617 | B1 | 3/2007 | Kanbara et al. |
| 7,204,148 | B2 | 4/2007 | Tanaka et al. |
| 7,274,358 | B2 | 9/2007 | Kent |
| 7,315,336 | B2 | 1/2008 | North et al. |
| 7,345,677 | B2 | 3/2008 | Ing et al. |
| 7,411,581 | B2 | 8/2008 | Hardie-Bick |
| 7,456,825 | B2 | 11/2008 | Kent et al. |
| 7,511,711 | B2 | 3/2009 | Ing et al. |
| 7,545,365 | B2 | 6/2009 | Kent et al. |
| 7,583,255 | B2 | 9/2009 | Ing |
| 7,649,807 | B2 | 1/2010 | Ing |
| 7,683,894 | B2 | 3/2010 | Kent |
| 7,920,133 | B2 | 4/2011 | Tsumura et al. |
| 8,085,124 | B2 | 12/2011 | Ing |
| 8,228,121 | B2 | 7/2012 | Benhamouda et al. |
| 8,237,676 | B2 | 8/2012 | Duheille et al. |
| 8,319,752 | B2 | 11/2012 | Hardie-Bick |
| 8,325,159 | B2 | 12/2012 | Kent et al. |
| 8,378,974 | B2 | 2/2013 | Aroyan et al. |
| 8,392,486 | B2 | 3/2013 | Ing |
| 8,427,423 | B2 | 4/2013 | Tsumura |
| 8,436,808 | B2 | 5/2013 | Chapman et al. |
| 8,493,332 | B2 | 7/2013 | D'Souza |
| 8,576,202 | B2 | 11/2013 | Tanaka et al. |
| 8,619,063 | B2 | 12/2013 | Chaine et al. |
| 8,638,318 | B2 | 1/2014 | Gao et al. |
| 8,648,815 | B2 | 2/2014 | Kent et al. |
| 8,659,579 | B2 | 2/2014 | Nadjar et al. |
| 8,670,290 | B2 | 3/2014 | Aklil et al. |
| 8,681,128 | B2 | 3/2014 | Scharff et al. |
| 8,692,809 | B2 | 4/2014 | D'souza |
| 8,692,810 | B2 | 4/2014 | Ing |
| 8,692,812 | B2 | 4/2014 | Hecht |
| 8,730,213 | B2 | 5/2014 | D'Souza et al. |
| 8,749,517 | B2 | 6/2014 | Aklil |
| 8,787,599 | B2* | 7/2014 | Grattan ................ 381/122 |
| 8,823,685 | B2 | 9/2014 | Scharff et al. |
| 8,854,339 | B2 | 10/2014 | Kent et al. |
| 8,890,852 | B2 | 11/2014 | Aroyan et al. |
| 8,896,429 | B2 | 11/2014 | Chaine |
| 8,896,564 | B2 | 11/2014 | Scharff et al. |
| 8,941,624 | B2 | 1/2015 | Kent et al. |
| 8,946,973 | B2 | 2/2015 | Pelletier |
| 8,994,696 | B2 | 3/2015 | Berget et al. |
| 9,046,959 | B2 | 6/2015 | Schevin et al. |
| 9,046,966 | B2 | 6/2015 | D'Souza |
| 9,058,071 | B2 | 6/2015 | Esteve |
| 2003/0161484 | A1 | 8/2003 | Kanamori et al. |
| 2004/0133366 | A1 | 7/2004 | Sullivan et al. |
| 2005/0063553 | A1 | 3/2005 | Ozawa |
| 2005/0146512 | A1 | 7/2005 | Hill et al. |
| 2005/0226455 | A1* | 10/2005 | Aubauer ................ H04R 7/045 381/388 |
| 2007/0019825 | A1 | 1/2007 | Marumoto et al. |
| 2009/0116661 | A1 | 5/2009 | Hetherington |
| 2010/0027810 | A1 | 2/2010 | Marton |
| 2010/0141408 | A1 | 6/2010 | Doy et al. |
| 2011/0001707 | A1 | 1/2011 | Faubert et al. |
| 2011/0182443 | A1* | 7/2011 | Gant ................ G06F 1/1605 381/114 |
| 2011/0191680 | A1 | 8/2011 | Chae et al. |
| 2011/0222372 | A1 | 9/2011 | O'Donovan et al. |
| 2011/0279382 | A1 | 11/2011 | Pertuit et al. |
| 2011/0300845 | A1 | 12/2011 | Lee |
| 2012/0002820 | A1 | 1/2012 | Leichter |
| 2012/0140954 | A1 | 6/2012 | Ranta |
| 2012/0300956 | A1 | 11/2012 | Horii |
| 2012/0306823 | A1* | 12/2012 | Pance ................ H04R 1/028 345/177 |
| 2013/0011144 | A1 | 1/2013 | Amiri Farahani et al. |

* cited by examiner

TOUCH INPUT SURFACE MICROPHONE

CROSS REFERENCE TO OTHER APPLICATIONS

This application claims priority to U.S. Provisional Patent Application No. 61/673,101 entitled TOUCH INTERFACE WITH MICROPHONE AND SPEAKER FUNCTIONALITY filed Jul. 18, 2012 which is incorporated herein by reference for all purposes.

BACKGROUND OF THE INVENTION

Touch screen devices such as smartphone and tablet computers have become increasing portable. Often the compact design of such touch screen devices makes it difficult to include a desirable speaker and a microphone. Challenges exist in the placement location and size of a speaker and a microphone that are to be included. Therefore, there exists a need for a better way to integrate a speaker and/or a microphone on a device.

BRIEF DESCRIPTION OF THE DRAWINGS

Various embodiments of the invention are disclosed in the following detailed description and the accompanying drawings.

DETAILED DESCRIPTION

Figure 1:
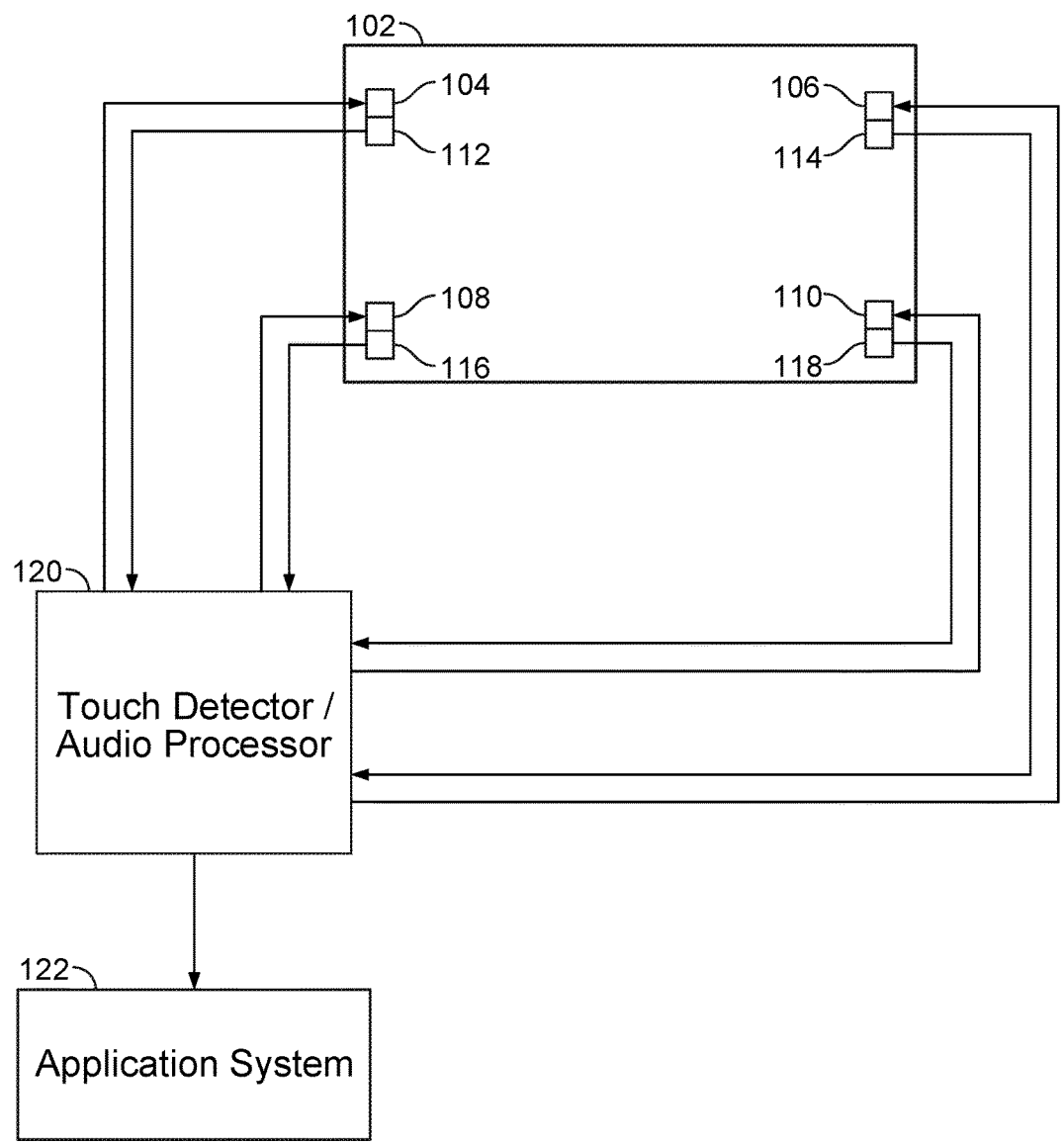
FIG. 1 is a block diagram illustrating an embodiment of a system for detecting a surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, microphone and speaker functionalities are integrated on a touch input detection system. In some embodiments, by placing transducers around a touch input medium such as a screen of a touchscreen, it becomes possible to convert the surface of the touch input medium into a speaker and/or microphone. Touch input medium materials are typically hard and can support vibrational modes in the human acoustic frequency band (e.g., 20 Hz to 20 kHz). The transducers may be a material or device that translates mechanical vibration in the human acoustic frequency band into electrical signals and vice-versa. For example, piezoelectric transducers are one class of such devices, as well as magnetohydrodynamic and magnetic actuators.

One potential benefit of the integration includes a cost benefit of integration, where a device implementing such an integrated touch input detector with microphone and speaker functionality would no longer have the cost of a separate microphone and speaker. Another potential benefit of the integration includes the advantages of a large area surface that can be used to collect and/or emit audio as compared to typically smaller membranes of traditional microphones and speakers. This may allow for a higher quality speaker and/or microphones as compared to conventional discrete implementations of the same functions.

In some embodiments, the implementation of a touch input detector with an integrated microphone and/or speaker functionality may require compensation for the possibility of touch input contacts that may occur while a touch input surface is being used as a microphone and/or speaker. For example, the surface of the touch interface is serving the function of a speaker membrane and/or a microphone membrane/diaphragm. If a user were to touch the membrane of a conventional speaker while it was producing sound, it would result in severe distortion of the audio due to the damping effect of the touch. Likewise, if one were to touch the membrane of a microphone while it was picking up audio or speech, the desired audio or speech signal would be entirely overwhelmed by a huge undesired transient from the large vibrational energy of the touch impact. Since the user is expected to simultaneously use the touch interface with the speaker and/or microphone, the effects of this interaction between the touch contacts and the speaker/microphone functionality may be desired to be eliminated.

A microphone is disclosed. In some embodiments, a surface configured to receive a touch input is also configured to receive audio as a microphone. For example, external audio vibrations received by a touch input medium such as touchscreen are detected by a detector coupled to the touch input medium (e.g., glass). However, a touch input such as a finger touching a touchscreen input surface may cause undesirable vibrations that might be detected as part of a microphone input audio signal. In some embodiments, the detected audio is processed to reduce an effect in the audio signal due to the touch input.

A speaker is disclosed. In some embodiments, a surface configured to receive a touch input is also configured to emit audio as a speaker. For example, a transducer coupled to a touch input medium such as touchscreen actuates/vibrates the touch input surface to cause the touch input medium to emit audio as a speaker. However, dampening caused by a touch input such as a finger touching a touchscreen input surface may cause undesirable distortion/dampening of the emitted audio. In some embodiments, the actuated audio is detected and processed to determine whether audio signals being emitted are being distorted due to a touch input. In some embodiments, one or more sensors coupled to the touch input medium detects the audio being actuated and the detected information is used to modify audio to be actuated to compensate for the distortion/dampening likely to be encountered when the audio is actuated. In some embodiments, the same touch input medium functions as both a microphone and a speaker.

FIG. 1 is a block diagram illustrating an embodiment of a system for detecting a surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and sensors 112, 114, 116, and 118. In various embodiments, the propagating medium includes one or more of the following: a panel, table, glass, screen, door, floor, whiteboard, glass, plastic, wood, steel, metal, semiconductor, insulator, conductor, and any medium that is able to propagate an acoustic or ultrasonic signal. For example, medium 102 is the glass surface of a display screen. A first surface of medium 102 includes a surface area where a user may touch to provide a selection input and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

In some embodiments, medium 102 is used on a microphone diaphragm and/or a medium used to collect audio. For example, vibrations caused on medium 102 by a sound wave are detected as an audio signal input. In some embodiments, medium 102 is used as a speaker diaphragm and/or a medium used to emit audio signal. For example, medium 102 is vibrated to emit a desired audio signal.

Examples of transmitters 104, 106, 108, and 110 include piezoelectric transducers, electromagnetic transducers, transmitters, sensors and/or any other transmitters and transducers capable of propagating a signal through medium 102. Examples of sensors 112, 114, 116, and 118 include piezoelectric transducers, electromagnetic transducers, transmitters and/or any other sensors and transducers capable of detecting a signal on medium 102. In some embodiments, the transmitters and sensors shown in FIG. 1 are coupled to medium 102 in a manner that allows a user input to be detected in a predetermined region of medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, transmitter 104 may propagate a signal through medium 102. Sensors 112, 114, 116, and 118 receive the propagated signal. In another embodiment, the transmitters/sensors in FIG. 1 are included in a flexible cable coupled to medium 102 via an encapsulant and/or glue material and/or fasteners. In some embodiments, the same transmitter and/or sensor used to detect touch input location is used to provide speaker output. In some embodiments, the same transmitter and/or sensor used to detect touch input location is used to receive microphone input. A transmitter and/or sensor may be used exclusively to provide speaker output and/or receive microphone input and is separate from another sensor and/or transmitter used to detect touch input location.

Touch detector/audio processor component 120 is connected to the transmitters and sensors shown in FIG. 1. In some embodiments, component 120 includes one or more of the following: an integrated circuit chip, a printed circuit board, a processor, and other electrical components and connectors.

In some embodiments, component 120 determines and sends a signal to be propagated by transmitters 104, 106, 108, and 110. Component 120 also receives the signal detected by sensors 112, 114, 116, and 118. The received signals are processed by component 120 to determine whether a disturbance associated with a user input has been detected at a location on a surface of medium 102 associated with the disturbance.

In some embodiments, component 120 receives and processes an audible audio signal detected by sensors 112, 114, 116, and 118. For example, component 120 determined an audio signal using an external audio vibration received by medium 102 and detected by one or more sensors coupled to medium 102. In some embodiments, the detected audio signal is processed to reduce an undesired component of the audio signal associated with an audio distortion (e.g., dampening) caused by a touch input on a surface of medium 102.

In some embodiments, component 120 determines and sends an audible audio signal to be emitted by transmitters 104, 106, 108, and 110. For example, one or more of transmitters 104, 106, 108, and 110 actuate/vibrate medium 102 to cause a desired audio signal to be emitted by medium 102. In some embodiments, one or more of sensors 112, 114, 116, and 118 detect the audio signal emitted by medium 102 to determine a distortion (e.g., dampening caused by touch input) on medium 102 that might be undesirably interfering with the audio signal being emitted/actuated. This detected disturbance may be used to modify an audio signal to be emitted to compensate for the detected distortion.

Component 120 is in communication with application system 122. Application system 122 uses information provided by component 120. For example, application system 122 receives from component 120 a coordinate associated with a user touch input that is used by application system 122 to control a software application of application system 122. In another example, application system 122 receives from component 120 an audio signal associated with a microphone input. In another example, application system 122 provided to component 120 an audio signal to be emitted as a speaker output. In some embodiments, application system 122 includes a processor and/or memory/storage. In other embodiments, component 120 and application system 122 are at least in part included/processed in a single processor. An example of data provided by component 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information. Another example of data provided by component 120 to application system 122 includes an audio signal and/or other data associated with a detected audio signal. An example of data provided to component 120 includes an audio signal and/or other data associated with an audio signal to be emitted.

In various embodiments, the components shown in FIG. 1 may exist in various combinations of hardware components. One or more of the components shown in FIG. 1 may be included in the same physical component. For example, transmitter 104 and sensor 112 may be included in the same transducer component. In some embodiments, a component shown in FIG. 1 may represent a plurality of physical components. For example, component 120 may represent a plurality of different components. Additional instances of any of the components shown in FIG. 1 may exist. Components not shown in FIG. 1 may also exist.

Figure 2:
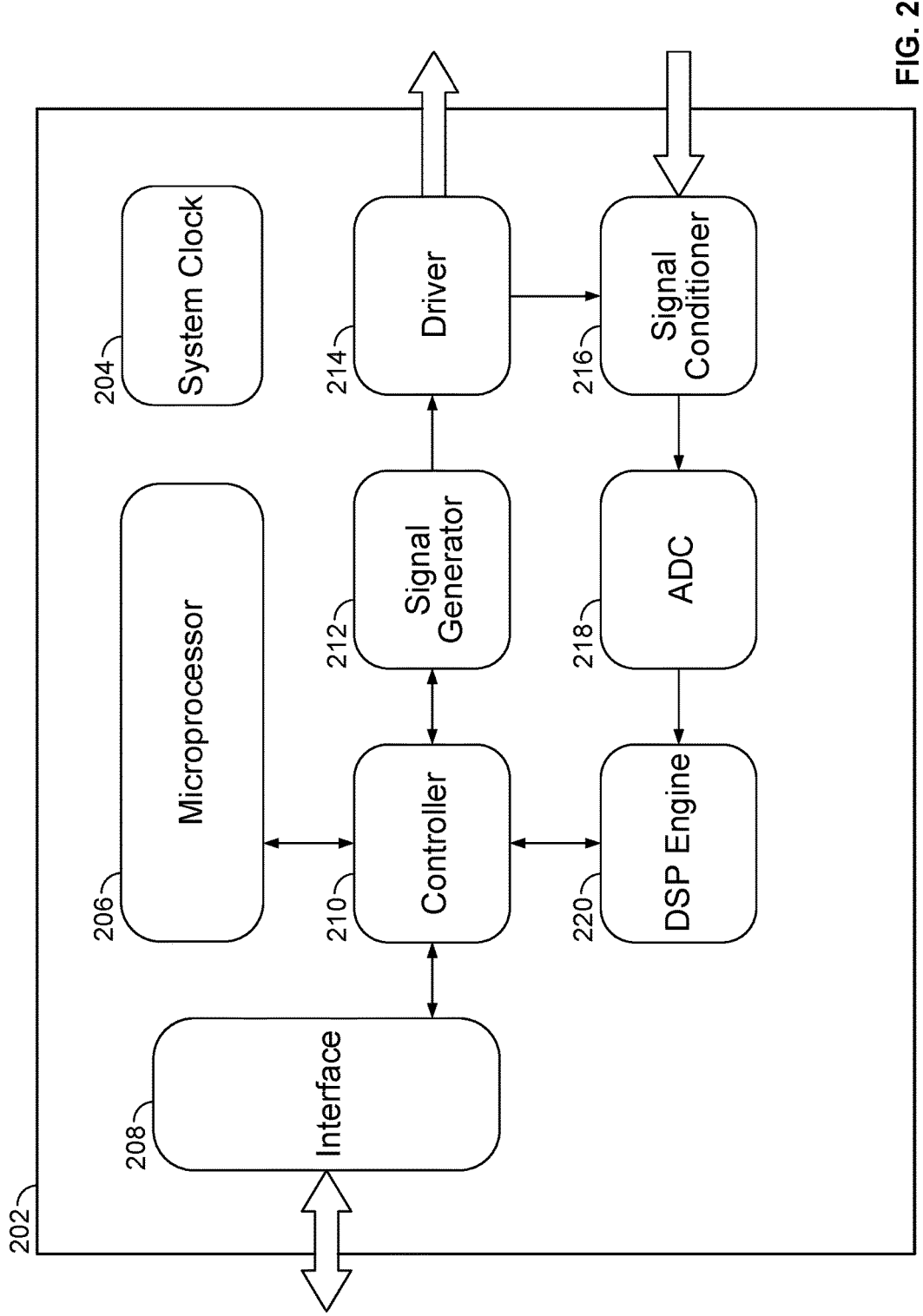
FIG. 2 is a block diagram illustrating an embodiment of a system for detecting a touch input.

FIG. 2 is a block diagram illustrating an embodiment of a system for detecting a touch input. In some embodiments, component 202 is included in touch component 120 of FIG. 1. In some embodiments, the system of FIG. 2 is integrated in an integrated circuit chip. Component 202 includes system clock 204 that provides a synchronous system time source to one or more other components of component 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of component 202. Microprocessor 206 may perform signal processing. In some embodiments, a memory is coupled to microprocessor 206 and is configured to provide microprocessor 206 with instructions.

In some embodiments, signal generator 212 generates a signal to be used to propagate a signal such as a signal propagated by transmitter 104 of FIG. 1. For example, signal generator 212 generates a pseudorandom binary sequence signal. Driver 214 receives the signal from generator 212 and drives one or more transmitters, such as transmitters 104, 106, 108, and 110 of FIG. 1, to propagate a signal through a medium. A signal detected from a sensor such as sensor 112 of FIG. 1 is received by component 202 and signal conditioner 216 conditions (e.g., filters) the received analog signal for further processing. For example, signal conditioner 216 receives the signal outputted by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 correlates the converted signal against a reference signal. The result of the correlation may be used by microprocessor 206 to determine a location associated with a user touch input. In some embodiments, the DSP engine determines an amplitude change associated with the converted signal and a reference signal. The amplitude change may be used by microprocessor 206 to determine a force associated with a user touch input. Interface 208 provides an interface for microprocessor 206 and controller 210 that allows an external component to access and/or control component 202. For example, interface 208 allows component 202 to communicate with application system 122 of FIG. 1 and provides the application system with location information associated with a user touch input.

In some embodiments, signal generator 212 generates a signal to be used to provide audio speaker output such as a signal emitted by transmitter 104 of FIG. 1. For example, signal generator 212 generates an audio signal based on a provided audio to be outputted. Driver 214 receives the signal from generator 212 and drives one or more transmitters, such as transmitters 104, 106, 108, and 110 of FIG. 1, to provide a speaker output. A signal detected from a sensor such as sensor 112 of FIG. 1 is received by component 202 and signal conditioner 216 conditions (e.g., filters) the received analog signal for further processing. For example, signal conditioner 216 receives an audio signal (e.g., detected speaker output and/or microphone input) and filters the audio signal to perform anti-aliasing, reduce noise from undesired frequencies, and/or select the desired signal (e.g., remove signals in frequencies used to detect touch input location). The conditioned signal is converted to a digital signal by analog-to-digital converter 218. The converted signal is processed by digital signal processor engine 220. For example, the converted signal is processed to determine how to modify an audio signal to be outputted to compensate for a detected distortion to an outputted audio signal of a speaker output. Microprocessor 206 may also be used to modify the audio signal. In another example, the converted signal is processed to reduce noise in the audio signal (e.g., by combing multiple detected signals) and/or reduce an undesired component of the audio signal due to the touch input (e.g., by performing a joint estimation to determine the undesired audio signal component). Interface 208 provides an interface for microprocessor 206 and controller 210 that allows an external component to access and/or control component 202. For example, interface 208 allows component 202 to communicate with application system 122 of FIG. 1 and receives audio data to be used to produce a speaker audio output. In another example, interface 208 provides detected audio data to be used as a microphone audio input.

Figure 3:
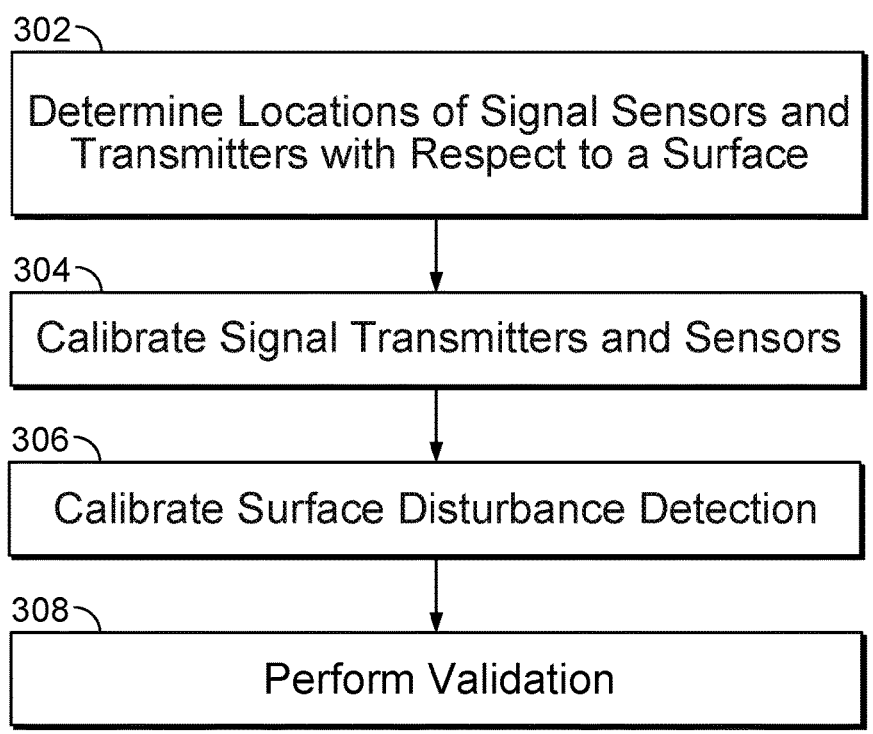
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal-to-noise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection.

At 308, a validation of a touch detection system is performed. For example, the system of FIG. 1 and/or FIG. 2 is testing using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
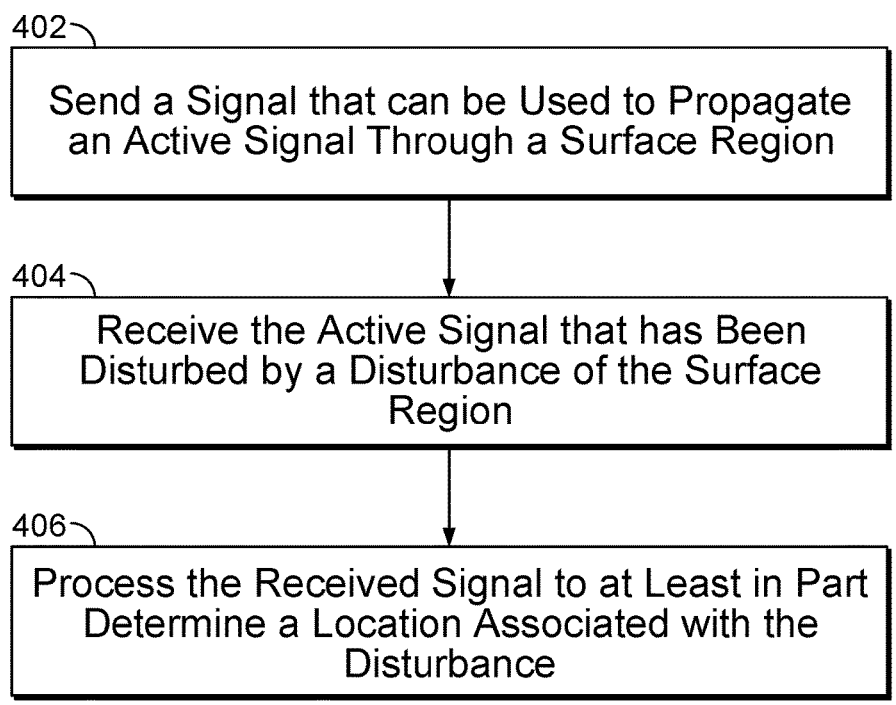
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch component 120 of FIG. 1 and/or touch component 202 of FIG. 2. At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic) through a propagating medium with the surface region. In some embodiments, the signal includes a sequence selected to optimize autocorrelation (e.g., resulting in a narrow/short peak) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

At 404, the active signal that has been disturbed by a disturbance of the surface region is received. The disturbance may be associated with a user touch indication. In some embodiments, the disturbance causes the active signal that is propagating through a medium to be detracted, attenuated, and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes comparing the received signal to a reference signal that has not been affected by the disturbance. The result of the comparison may be used with a result of other comparisons performed using the reference signal and other signal(s) received at a plurality of sensors. The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
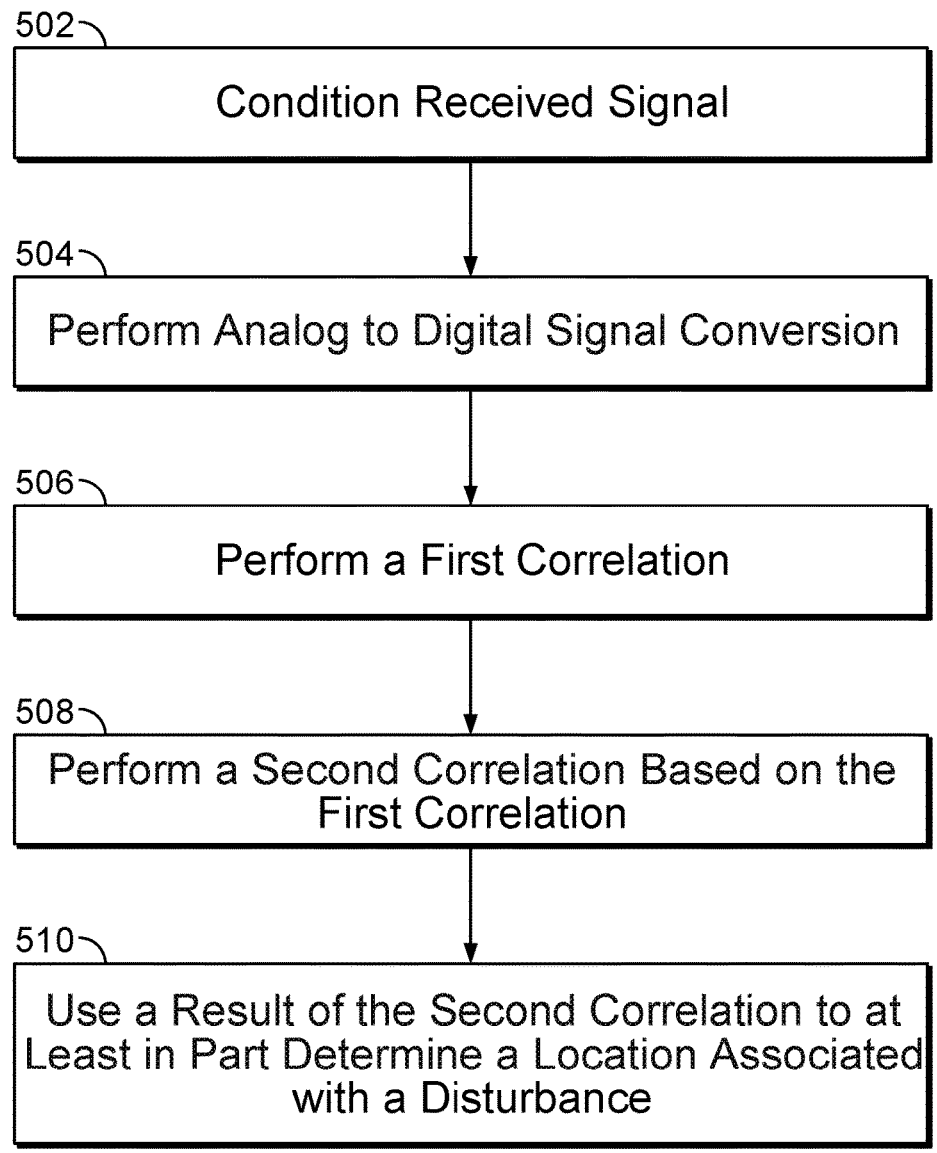
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch component 120 of FIG. 1 and/or touch component 202 of FIG. 2. At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used. The resulting digital signal is used to perform a first correlation at 506. In some embodiments, performing the first correlation includes correlating the converted signal with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., using a reference time value determined at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a pressure of a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal used in 506 is a simplified reference signal that can be used to efficiently correlate the reference signal over a relatively large time difference (e.g., lag-time) between the received and converted signal and the reference signal.

At 508, a second correlation is performed based on a result of the first correlation. Performing the second correlation includes correlating (e.g., cross-correlation or convolution similar to step 506) the converted signal in 504 with a second reference signal. The second reference signal is a more complex/detailed (e.g., more computationally intensive) reference signal as compared to the first reference signal used in 506. In some embodiments, the second correlation is performed in 508 because using the second reference signal in 506 may be too computationally intensive for the time interval required to be correlated in 506. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that correspond to a disturbance caused by a touch input at a location on a surface of a propagating medium. In other embodiments, the second correlation is optional. For example, only a single correlation step is performed.

At 510, a result of the second correlation is used to at least in part determine a location associated with a disturbance. In some embodiments, determining the location includes comparing a determined time value where the signals of the second correlation are most correlated and comparing the determined time value with a reference time value (e.g., using a reference time value determined at 306 of FIG. 3) not associated with a touch input disturbance, to determine a time delay/offset or phase difference caused on the received signal due to the disturbance (e.g., caused by a touch input). This time delay is associated with a signal received at a first sensor and other time delays due to the disturbance at other signals received at other sensors are used to calculate a location of the disturbance relative to the locations of the sensors. By using the location of the sensors relative to a surface of a medium that has propagated the received signal, a location on the surface where the disturbance originated may be determined.

Figure 6:
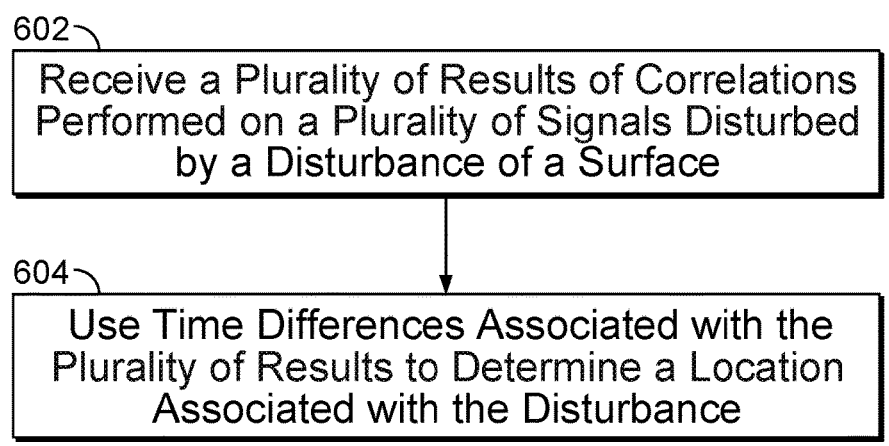
FIG. 6 is a flow chart illustrating an embodiment of a process for determining a location associated with a disturbance.

FIG. 6 is a flowchart illustrating an embodiment of a process for determining a location associated with a disturbance. In some embodiments, the process of FIG. 6 is included in 510 of FIG. 5. At 602, a plurality of results of correlations performed on a plurality of signals disturbed by a disturbance of a surface is received. For example, a result of the correlation performed at 508 of FIG. 5 is received. In some embodiments, a signal is propagated using transmitter 104 and sensors 114, 116, and 118 each receives the propagated signal that has been disturbed by a touch input on or near a surface of medium 102 of FIG. 1. The propagated signal may contain a predetermined signal and the predetermined signal is received at the various sensors. Each of the received signals is correlated with a reference signal to determine the results received at 602. In some embodiments, the received results are associated with a same signal content (e.g., same binary sequence) that has been freely propagated on a medium at the same time. In some embodiments, the received results are associated with different signal contents that have been disturbed by the same disturbance.

At 604, time differences associated with the plurality of results are used to determine a location associated with the disturbance. In some embodiments, each of the time differences is associated with a time when signals used in the correlation are most correlated. In some embodiments, the time differences are associated with a determined time delay/offset or phase difference caused on the received signal due to the disturbance. This time delay may be calculated by comparing a time value determined using a correlation with a reference time value that is associated with a scenario where a touch input has not been specified. The result of the comparison may be used to calculate a location of the disturbance relative to the locations of sensors that received the plurality of signals. By using the location of the sensors relative to a surface of a medium that has propagated the received signal, a location on the surface where the disturbance originated may be determined.

Figure 7:
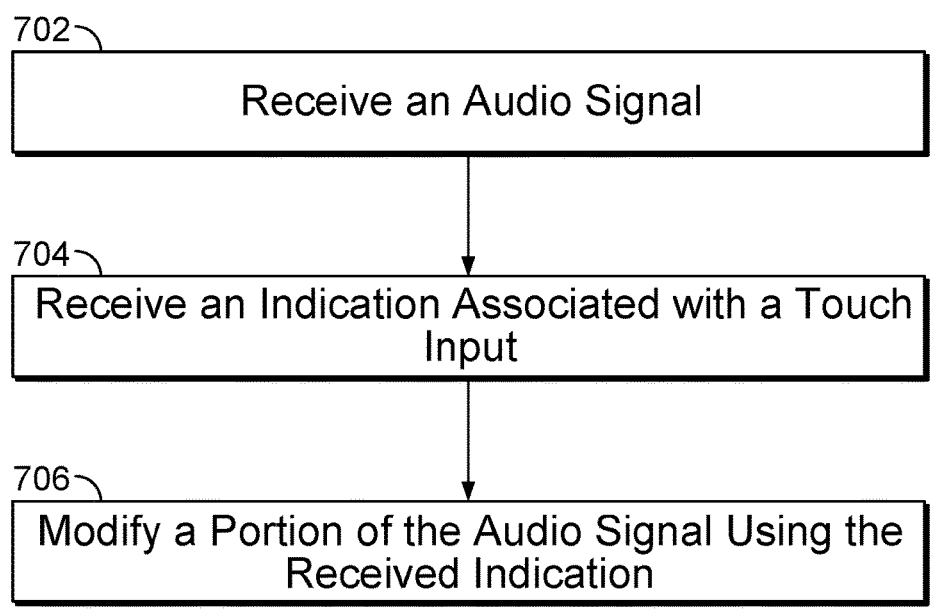
FIG. 7 is a flowchart illustrating an embodiment of a process for receiving audio input.

FIG. 7 is a flowchart illustrating an embodiment of a process for receiving audio input. At least a portion of the process of FIG. 7 may be implemented on component 120 of FIG. 1 and/or component 202 of FIG. 2. In some embodiments, the process of FIG. 7 is used to receive a microphone input.

At 702, an audio signal is received. In some embodiments, receiving the audio signal includes receiving an audio signal from a sensor (e.g., transducer) coupled to a touch input medium. For example, vibrations on the touch input medium are detected by a transducer such as a piezoelectric transducer and translated into an electrical audio signal. In some embodiments, the received signal was received from one or more of sensors 112, 114, 116, and 118 of FIG. 1. In some embodiments, the audio signal was received at component 120 of FIG. 1 and/or component 202 of FIG. 2. In some embodiments, the received signal is amplified (e.g., using amplifier 802 or 818 of FIG. 8). For example, the received signal is amplified using an acoustic-band low-noise amplifier. In some embodiments, the amplified signal is filtered (e.g., using filter 804 or 820 of FIG. 8). For example, the amplified signal is anti-alias filtered, filtered to remove noise, and/or filtered to remove undesired frequencies. In some embodiments, the received signal is low-pass filtered to remove signals associated with touch input location detection. For example, a desired signal is within an audible frequency range (e.g., below 20 kHz) and frequencies (e.g., above 20 kHz) used to detect touch input detection are filtered out. In some embodiments, the filtered signal is converted from an analog signal to a digital signal using an analog to digital signal converter (e.g., using converter 806 or 822 of FIG. 8). The received audio signal may be one of a plurality of signals received. For example, each of a plurality of transducers coupled to a touch input medium detects an audio signal from vibrations on the touch input medium and signals from each of the transducers are received for processing.

At 704, an indication associated with a touch input is received. In some embodiments, the indication is used at least in part to determine a portion of the received signal associated with a touch input. For example, the indication can be used to determine the beginning of a portion of the received signal that likely includes an audio disturbance (e.g., sound of finger tapping a touch screen display). In some embodiments, the indication includes an identifier associated with a time value. In some embodiments, the indication includes an identifier associated with a touch input location. In some embodiments, the indication includes a location identifier determined at 604 of FIG. 6.

At 706, a portion of the audio signal associated with a touch input is modified using the received indication. In some embodiments, modifying the audio signal includes muting a portion of the audio signal. In some embodiments, modifying the audio signal includes determining a portion of the audio signal due to the touch input and subtracting the determined portion from the audio signal. In some embodiments, by modifying the audio signal, a microphone input signal that effectively cancels undesirable audio noise associated with touch input on a touch input medium is produced. The modified audio signal may be provided as a processed microphone signal for an application such as an application of application system 122 of FIG. 1.

Figure 8:
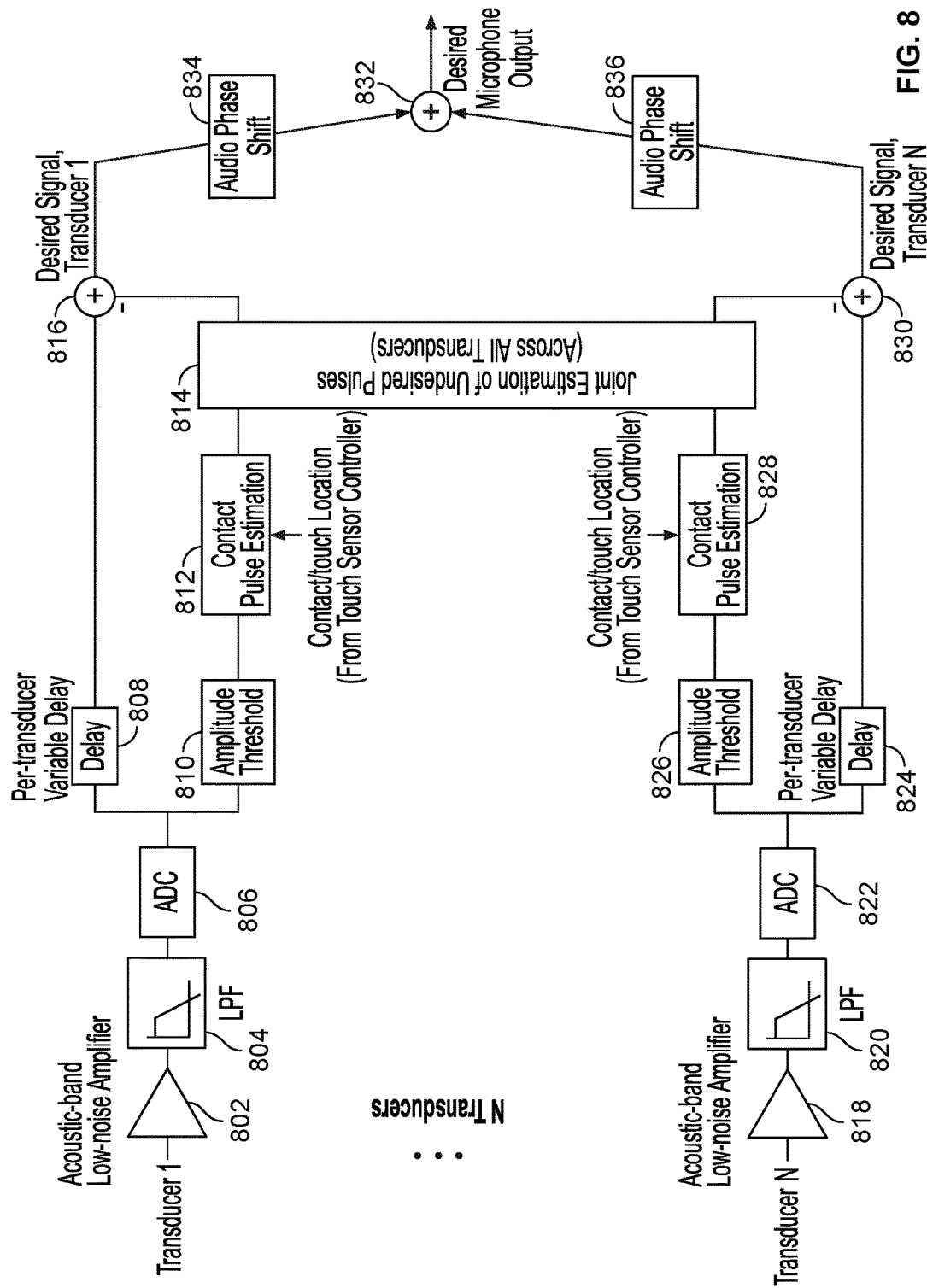
FIG. 8 is a block diagram illustrating an example schematic of a microphone.
Figure 9:
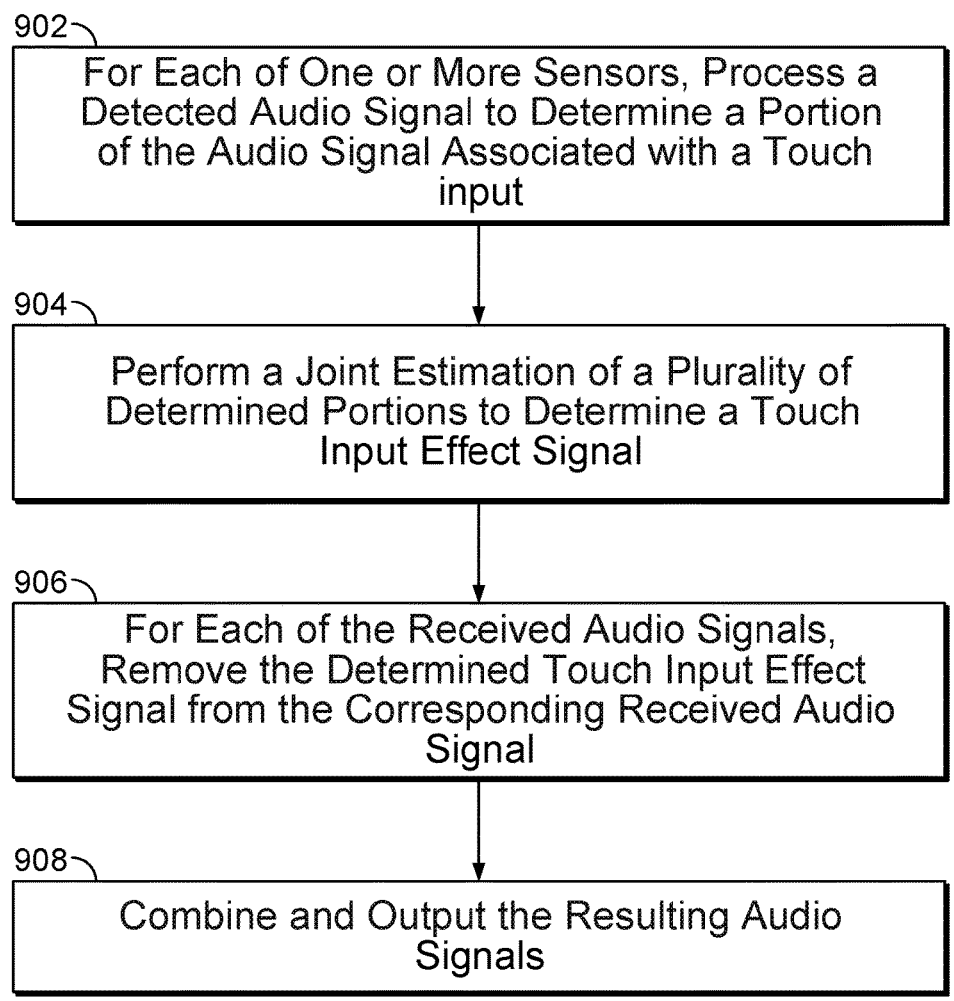
FIG. 9 is a flowchart illustrating an embodiment of a process for processing an audio input using joint estimation.

FIG. 8 is a block diagram illustrating an example schematic of a microphone. In some embodiments, one or more components of FIG. 8 are included in component 120 of FIG. 1 and/or component 202 of FIG. 2. In some embodiments, at least a portion of the process of FIG. 7 is implemented by one or more components of FIG. 8. In some embodiments, at least a portion of the process of FIG. 9 is implemented by one or more components of FIG. 8. FIG. 9 shows audio signal inputs being received from "N" number of sensor transducers. To simplify the example and illustrate the example clearly, only components of processing two of the audio signals are shown in FIG. 9. Additional audio signal(s) from other transducer(s) may be processed using similar components coupled to joint estimator 814 and signal combiner 832 of FIG. 8. For example, for each additional transducer signal source, additional components of an amplifier (e.g., similar to amplifier 802), a signal filter (e.g., similar to filter 804), an analog to digital converter (e.g., similar to converter 806), a delay component (e.g., similar to component 808), a threshold detector (e.g., similar to detector 810), a pulse estimator (e.g., similar to estimator 812) and a signal combiner (e.g., similar to combiner 816) may be included. The components shown in FIG. 8 are referenced and described throughout the specification. For example, the process of FIGS. 7, 9, and 10 describe embodiments utilizing one or more components of FIG. 8.

FIG. 9 is a flowchart illustrating an embodiment of a process for processing an audio input using joint estimation. At least a portion of the process of FIG. 9 may be implemented on component 120 of FIG. 1 and/or component 202 of FIG. 2. In some embodiments, a portion of the process of FIG. 9 may be implemented on one or more components of FIG. 8. In some embodiments, the process of FIG. 9 is included in step 706 of FIG. 7.

At 902, for each of one or more sensors, a detected audio signal is processed to determine a portion of the audio signal associated with a touch input. In some embodiments, the one or more sensors include a transducer coupled to a touch input medium. For example the sensors include one or more of sensors 112, 114, 116, and 118 of FIG. 1. In some embodiments, the sensors include one or more sensors dedicated to only receiving microphone input and/or providing speaker output. In some embodiments, the audio signal was received at component 120 of FIG. 1 and/or component 202 of FIG. 2. In some embodiments, the audio signal includes the audio signal received and processed at 702 of FIG. 7. For example, an audio signal from a transducer is amplified (e.g., using amplifier 802 or 818 of FIG. 8), filtered (e.g., using filter 804 or 820 of FIG. 8), converted to a digital audio signal (e.g., using converter 806 or 822 of FIG. 8), and provided for additional processing.

In some embodiments, determining the portion of the audio signal includes determining a time value associated with a likely time location within the audio signal that includes an audio associated with a touch input (e.g., using estimation component 812 or 828 of FIG. 8). For example, when a user is touching a touch input surface to provide user interface inputs, undesirable tapping sounds may be detected as a microphone audio input. In order to reduce the tapping sounds in the audio signal, it may be desirable to locate the portion of the detected audio signal that represents the tapping sounds. In some embodiments, determining the audio portion includes receiving a touch input location identifier (e.g., location identifier determined in 604 of FIG. 6). For example, when a touch input creates a vibration/sound (e.g., tapping sound) on a touch input surface, the time it takes for the vibration to travel to a sensor detecting the vibration may depend on the distance between the source of the vibration (i.e., touch input location) and the physical location of the sensor detecting the vibration. By determining the physical distance from the received identifier of the touch input location and the physical location of a sensor that detected the vibration, a time value (e.g., time offset from when the touch input location identifier was received) identifying where in the received audio signal an audio (e.g., audio signal pulse) associated with the touch input is located. In some embodiments, determining the portion includes determining a range of portions (e.g., time intervals) within the received signal where an audio associated with a touch input is possibly located temporally. In some embodiments, one or more components determining the portion of the audio signal (e.g., software and/or hardware component determining temporal location of audio due to touch input) are only activated when an amplitude threshold is detected in a received signal. For example, an audio signal portion due to a touch input may be associated with larger amplitude than a normal range of audio detected (e.g., using threshold detector 810 or 826 of FIG. 8). In some embodiments, utilization of one or more components used to minimize an audio effect of a touch input is controlled based on a detected amplitude of an audio signal. For example, the one or more components are only engaged (e.g., gated to only allow specific input signals) when it is detected that an amplitude of a received audio signal meets a predetermined, configurable and/or dynamically determined threshold.

At 904, a joint estimation of a plurality of determined portions is performed to determine a touch input effect signal (e.g., using joint estimator 814 of FIG. 8). The plurality of determined portions includes the portions determined in 902. For example, for each sensor coupled to touch input medium, a portion of a received signal from the sensor has been identified. The identified portion includes an audio signal that may include both a desired component (e.g., a human voice recorded in the identified portion) and an undesired component (e.g., tapping sound from touch input recorded in the identified portion). Using the identified portions from a plurality of sensors, a joint estimation may be performed to identify the undesired audio component. For example, each identified portion includes a different observation (i.e., recording) of the same undesired audio component due to the touch input. Because the undesired audio component is likely located in different temporal locations of each received signal from each sensor (e.g., due to the variance in travel time between the touch input location and location of the sensor) and the undesired audio is likely larger in amplitude as compared to the desired audio component, a joint estimation may be performed to isolate the undesired audio component.

In some embodiments, performing the joint estimation includes performing one or more of the following: temporally shifting one or more of the identified audio signal components, compensating for phase differences between identified audio signal components, and compensating for amplitude differences between identified audio signal components. In some embodiments, performing the joint estimation includes determining a signal that maximizes a signal-to-noise ratio of the desired signal when the identified audio signal components are combined. For example, the audio signals are averaged. In another example, the audio signals are time shifted, phase compensated, amplitude compensated to determine an averaged signal that maximizes a signal-to-noise ratio when the identified audio signal components are combined. In some embodiments, a touch input effect signal results from the joint estimation processing. In some embodiments, a different touch input effect signal is determined for each identified audio signal portion. For example, a resulting signal from the joint estimation processing is adjusted to match a temporal shift, phase, and/or amplitude associated with the specific identified audio signal portion. In some embodiments, the same touch input effect signal is determined for each sensor. The touch input effect signal includes an audio signal that ideally only includes the undesired audio due to the touch input by minimizing audio components uncorrelated with or not due to the touch input.

At 906, the determined touch input effect signal for each of the received audio signal is removed from the corresponding received audio signal. In some embodiments, removing the signal includes using a signal combiner (e.g., signal combiner 816 or 830 of FIG. 8) to subtract the corresponding touch input effect signal from the corresponding received audio signal. In some embodiments, the received signal has been delayed (e.g., using delay component 808 or 824 of FIG. 8) to allow time for determination of the corresponding touch input effect signal. For example, it is desirable to match the temporal location of the touch input effect signal with the corresponding portion within the received signal when the touch input effect signal is subtracted from the corresponding received signal. In some embodiments, the length of the delay is preconfigured, dynamically determined, and/or configurable. In some embodiments, the length of the delay differs based on which sensor detected the received audio signal. The length of the delay may be determined for a received signal based on one or more of the following: a processing time, a touch input location, and a sensor identifier. The resulting signal for each received audio signal ideally only includes a desired audio signal with minimized undesirable audio signal components from a touch input.

At 908, the resulting audio signals are combined and outputted. In some embodiments, combining the audio signal includes using a signal combiner (e.g., combiner 832 of FIG. 8) to sum the resulting signals. In some embodiments, by summing the plurality of resulting signals, a signal-to-noise ratio is improved. In some embodiments, combining the audio signal includes using a signal combiner to average the resulting signals. In some embodiments, outputting the combined signal includes providing the combined signal as a detected microphone input signal. In some embodiments, the desired signal can be enhanced by introduction of a variable delay or audio phase shift to each of the plurality of resulting signals (e.g., audio phase shift 834) in each path. Since each of the resulting signals can be associated with a transducer, the spatial separation of the transducers as placed on the touch input medium can be used to create directivity and enhanced sensitivity of the microphone functionality. The input signal may be provided to an application system such as application system 122 of FIG. 1 and/or a user application.

Figure 10:
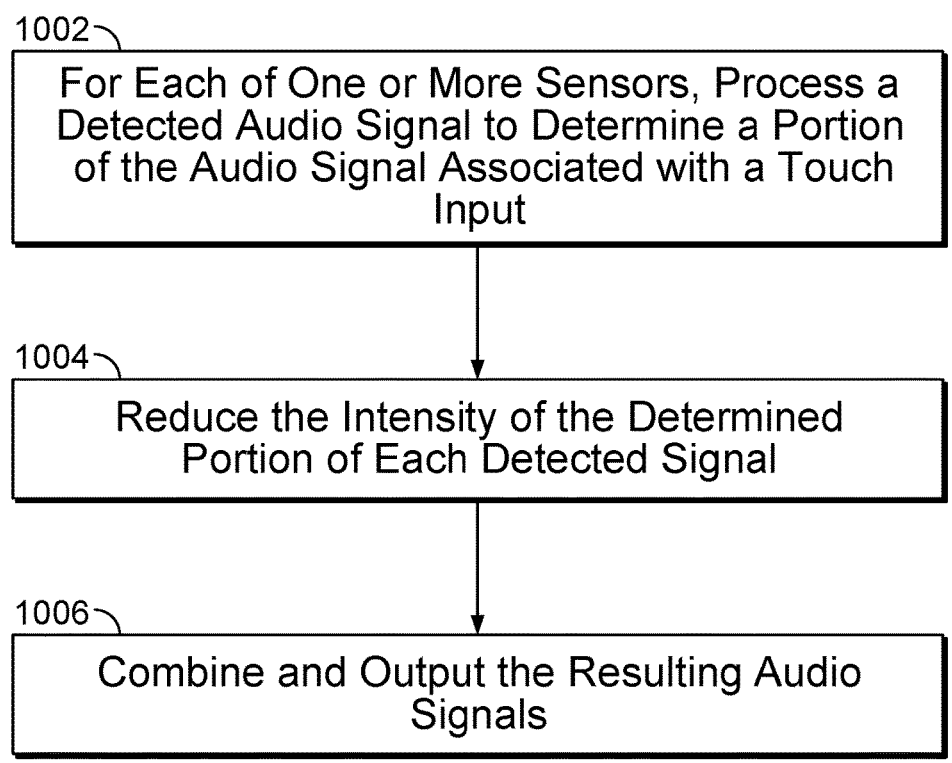
FIG. 10 is a flowchart illustrating an embodiment of a process for processing an audio input to reduce the intensity of a portion of the audio input.

FIG. 10 is a flowchart illustrating an embodiment of a process for processing an audio input to reduce the intensity of a portion of the audio input. At least a portion of the process of FIG. 10 may be implemented on component 120 of FIG. 1 and/or component 202 of FIG. 2. In some embodiments, the process of FIG. 10 is included in step 706 of FIG. 7.

At 1002, for each of one or more sensors, a detected audio signal is processed to determine a portion of the audio signal associated with a touch input. In some embodiments, the one or more sensors include a transducer coupled to a touch input medium. For example, the sensors include one or more of sensors 112, 114, 116, and 118 of FIG. 1. In some embodiments, the sensors include one or more sensors dedicated to only receiving microphone input and/or provided speaker output. In some embodiments, the audio signal was received at component 120 of FIG. 1 and/or component 202 of FIG. 2. In some embodiments, the audio signal includes the audio signal received and processed at 702 of FIG. 7. For example, an audio signal from a transducer is amplified (e.g., using amplifier 802 or 818 of FIG. 8), filtered (e.g., using filter 804 or 820 of FIG. 8), converted to a digital audio signal (e.g., using converter 806 or 822 of FIG. 8), and provided for additional processing.

In some embodiments, determining the portion of the audio signal includes determining a time value associated with a likely time location within the audio signal that includes an audio associated with a touch input (e.g., using estimation component 812 or 828 of FIG. 8). For example, when a user is touching a touch input surface to provide user interface inputs, undesirable tapping sounds may be detected as a microphone audio input. In order to reduce the tapping sounds in the audio signal, it may be desirable to locate the portion of the detected audio signal that captured the tapping sounds. In some embodiments, determining the audio portion includes receiving a touch input location identifier (e.g., the location identifier determined in 604 of FIG. 6). For example, when a touch input creates a vibration/sound (e.g., tapping sound) on a touch input surface, the time it takes for the vibration to travel to a sensor detecting the vibration may depend on the distance between the source of the vibration (i.e., touch input location) and the physical location of the sensor detecting the vibration. By determining the physical distance from the received identifier of the touch input location and the physical location of a sensor that detected the vibration, a time value (e.g., time offset from when the touch input location identifier was received) identifying where in the received audio signal an audio (e.g., audio signal pulse) associated with the touch input is located. In some embodiments, determining the portion includes determining a range of portions (e.g., time interval) within the received signal where an audio associated with a touch input is possibly located temporally. In some embodiments, one or more components determining the portion of the audio signal (e.g., software and/or hardware components determining the temporal location of audio due to touch input) are only activated when an amplitude threshold is detected in a received signal. For example, an audio signal portion due to a touch input may be associated with larger amplitude than a normal range of audio detected (e.g., using threshold detector 810 or 826 of FIG. 8). In some embodiments, utilization of one or more components used to minimize an audio effect of a touch input is controlled based on a detected amplitude of an audio signal. For example, the one or more components are only engaged (e.g., gated to only allow specific input signals) when it is detected that an amplitude of a received audio signal meets a predetermined, configurable, and/or dynamically determined threshold.

At 1004, the intensity of the determined portion of each detected signal is reduced. The determined portion includes the portions determined in 1002. For example, for each sensor coupled to the touch input medium, a portion of a received signal from the sensor has been identified. The identified portion includes an audio signal that includes both a desired component (e.g., a human voice recorded in the identified portion) and an undesired component (e.g., tapping sound from touch input recorded in the identified portion). In order to eliminate the undesired audio component due to a touch input, the determined portion with the undesirable audio component may be muted (e.g., zeroed or no signal during the determined portion). This may result in a desired audio component of the signal being muted as well. In some embodiments, reducing the intensity of the determined portion includes reducing the amplitude of at least a portion of the determined portion of the signal. The amount the amplitude is reduced may be preconfigured, configurable, and/or dynamically determined. For example, the amplitude of the determined portion may be completely reduced or reduced to a predetermined percentage, or dynamically determined based on an average amplitude value.

At 1006, the resulting audio signals are combined and outputted. In some embodiments, combining the audio signal includes using a signal combiner (e.g., combiner 832 of FIG. 8) to sum the resulting signals from step 1004. In some embodiments, by summing the plurality of resulting signals, a signal-to-noise ratio is improved. In some embodiments, combining the audio signal includes using a signal combiner to average the resulting signals. In some embodiments, outputting the combined signal includes providing the combined signal as a detected microphone output signal. The output signal may be provided to an application system such as application system 122 of FIG. 1 and/or a user application.

Figure 11:
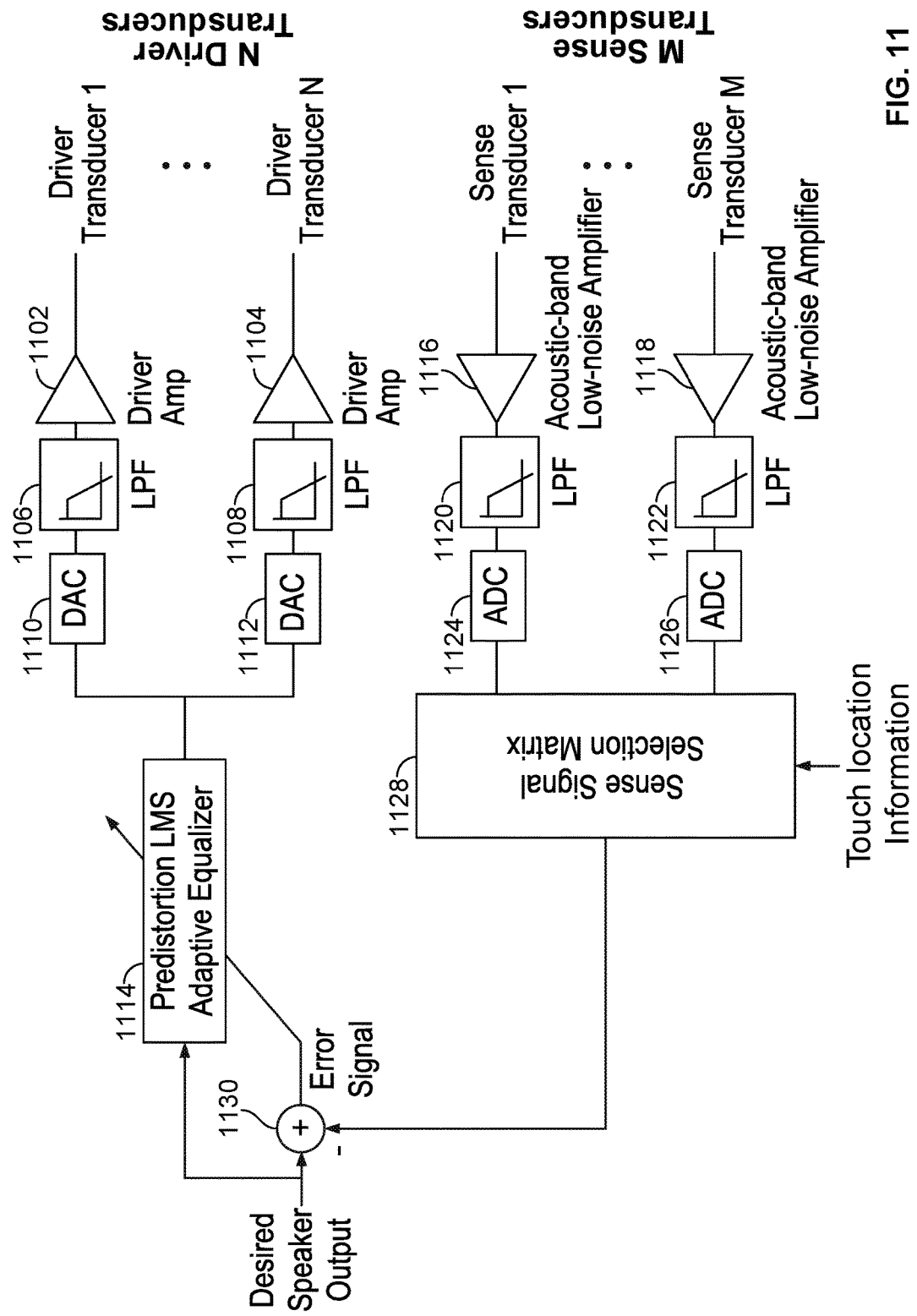
FIG. 11 is block diagram illustrating a schematic of an example of a feedback compensated speaker.

FIG. 11 is block diagram illustrating a schematic of an example of a feedback compensated speaker. In some embodiments, one or more components of FIG. 11 are included in component 120 of FIG. 1 and/or component 202 of FIG. 2. In some embodiments, at least a portion of the process of FIG. 12 is implemented by one or more components of FIG. 11.

FIG. 11 shows audio signal outputs being driven from "N" number of driver transducers. For example, the driver transducers are coupled to a touch input medium such as medium 102 of FIG. 1. When the driver transducers vibrate the medium using the audio signal, the medium emits audio that is provided as a speaker output. In some embodiments, the driver transducers of FIG. 11 are one or more of the transmitters 104, 106, 108, and 110 shown in FIG. 1. FIG. 11 shows audio signal inputs being received from "M" number of sense transducers. For example, the sense transducers are coupled to a touch input medium such as medium 102 of FIG. 1 and detect vibrations outputted by driver transducers of FIG. 11. In some embodiments, the driver transducers of FIG. 11 are one or more of the sensors shown in FIG. 1. In some embodiments, a single hardware transducer is both a driver transducer and a sense transducer. In some embodiments, the audio signals received by the sense transducers are processed to determine how to modify signals to be used to drive the driver transducers to compensate for the distortion/dampening on the touch input medium.

To simplify the example and illustrate the example clearly, only components of driving two driver transducers and processing signals from two sense transducers are shown in FIG. 11. Additional driver transducers may be provided an audio signal to be used to drive a touch input medium using additional components (not shown in FIG. 11) coupled to equalizer 1114. For example, for each additional driver transducer to be utilized, additional components of an amplifier (e.g., similar to amplifier 1102), a filter (e.g., similar to filter 1106), and a digital to analog converter (e.g., similar to converter 1110) are utilized. Although the example shown in FIG. 11 shows a single equalizer 1114 connected to multiple converter components, in other embodiments, multiple equalizers such as equalizer 1114 may be utilized. For example, for each driver transducer, a different predistortion equalizer may be utilized. Additional sense transducers (not shown in FIG. 11) may be used to detect an audio signal using additional components (not shown in FIG. 11) connected to selection matrix component 1128. For example, for each additional sense transducer to be utilized, additional components of an amplifier (e.g., similar to amplifier 1116), a filter (e.g., similar to filter 1120), and an analog to digital converter (e.g., similar to converter 1124) are utilized. The components shown in FIG. 11 are referenced and described throughout the specification. For example, the process of FIG. 12 describes embodiments utilizing one or more components of FIG. 11.

Figure 12:
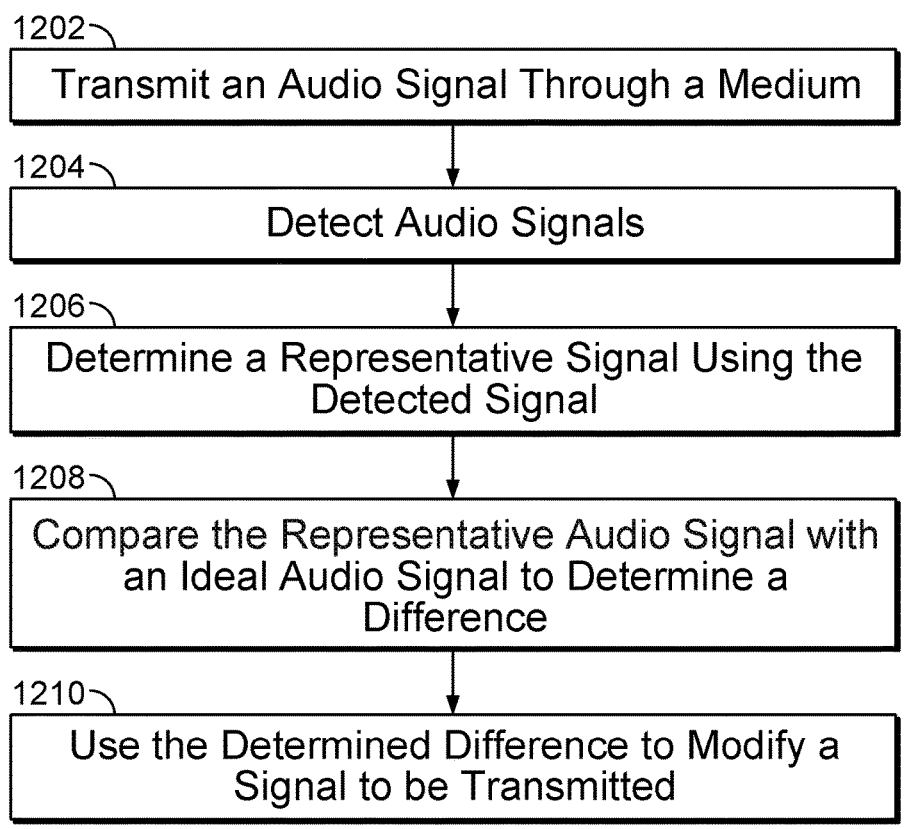
FIG. 12 is a flowchart illustrating an embodiment of a process for providing an audio output.

FIG. 12 is a flowchart illustrating an embodiment of a process for providing an audio output. At least a portion of the process of FIG. 12 may be implemented on component 120 of FIG. 1 and/or component 202 of FIG. 2. In some embodiments, at least a portion of the process of FIG. 12 may be implemented on one or more components of FIG. 11.

At 1202, an audio signal is transmitted through a medium. In some embodiments, transmitting the audio signal includes rendering the audio signal from a driver transducer coupled to a touch input medium. For example, an audio signal to be outputted via a speaker is applied to a piezoelectric transducer and translated into vibrations on the touch input medium. In some embodiments, the audio signal is transmitted from one or more of transmitters 104, 106, 108, and 110 of FIG. 1. In some embodiments, a plurality of transducers transmits one or more versions of an audio signal to be played on a speaker. In some embodiments, the audio signal to be transmitted is provided by component 120 of FIG. 1 and/or component 202 of FIG. 2. In some embodiments, transmitting the audio signal includes converting a digital version of the audio signal to an analog version of the audio signal. For example, a digital audio signal is converted to an analog signal using a digital to analog signal converter (e.g., using converter 1110 or 1112 of FIG. 11). The transmitted audio signal may be one of a plurality of signals to be transmitted. For example, each of a plurality of transducers coupled to a touch input medium transmits one or more versions of an audio signal. In some embodiments, the analog signal is filtered (e.g., using filter 1106 or 1108 of FIG. 11). For example, the analog signal is filtered to remove unwanted out-of-band signal images from the digital-to-analog converter, smooth the resulting waveform, reduce noise, and/or filtered to remove undesired frequencies. In some embodiments, the filtered signal is amplified (e.g., using amplifier 1102 or 1104 of FIG. 11) and the amplified signal is used to drive a transducer.

At 1204, an audio signal is detected. In some embodiments, detecting the audio signal includes receiving an audio signal from a sensor (e.g., transducer) coupled to a touch input medium. For example, vibrations (e.g., audio signal transmitted at 1202) on the touch input medium actuated by a driver transducer is detected by a sense transducer such as a piezoelectric transducer and translated into an electrical audio signal. In some embodiments, the detected audio signal has been distorted/dampened by an object contacting the touch input medium. For example, when a user touches the touch input surface to provide a user input, an audio signal being transmitted/vibrated through the touch input medium may be dampened at the location of the touch. This may lead to an undesirable muffling of sound being outputted by the touch input medium speaker. By detecting and predistorting the audio signal to be transmitted, the undesirable effect of the distortion/dampening source may be reduced.

In some embodiments, the detected signal was received from one or more of sensors 112, 114, 116, and 118 of FIG. 1. In some embodiments, the audio signal was received at component 120 of FIG. 1 and/or component 202 of FIG. 2. In some embodiments, the received signal is amplified (e.g., using amplifier 1116 or 1118 of FIG. 11). For example, the received signal is amplified using an acoustic-band low-noise amplifier. In some embodiments, the amplified signal is filtered (e.g., using filter 1120 or 1122 of FIG. 11). For example, the amplified signal is anti-alias filtered, filtered to remove noise, and/or filtered to remove undesired frequencies. In some embodiments, the received signal is low-pass filtered to remove signal frequencies associated with touch input location detection. For example, a desired signal is within an audible frequency range (e.g., below 20 kHz) and frequencies (e.g., above 20 kHz) used to detect touch input detection is filtered out. In some embodiments, the filtered signal is converted from an analog signal to a digital signal using an analog to digital signal converter (e.g., using converter 1124 or 1126 of FIG. 11). The received audio signal may be one of a plurality of signals received. For example, each of a plurality of sense transducers coupled to a touch input medium detects an audio signal from vibrations on the touch input surface and signals are received for processing.

At 1206, a representative signal is determined using the detected signal. In some embodiments, each transducer coupled to the touch input medium provides a detected audio signal. Depending on the location of the distortion/dampening source on the touch input medium, a different audio signal may be detected at each transducer. For example, a transducer physically located closest to the dampening source may receive a highly distorted/dampened audio signal as compared to the originally transmitted audio signal and a transducer physically located furthest away from the dampening source may receive the least distorted/dampened audio signal. In some embodiments, using the received signal, a representative signal that can be used to modify (e.g., pre-distort) an audio signal to be outputted is determined. In some embodiments, the representative signal is determined by a component such as component 1128 of FIG. 11. In some embodiments, determining the representative signal includes receiving and using information identifying a location where a touch input was received. For example, the location identifier determined at 604 of FIG. 6 is received. In some embodiments, determining the representative signal includes selecting a signal among a plurality of received signals from a plurality of transducers coupled to the touch input medium. For example, the received signal from a sensor (e.g., transducer) located furthest away from a received touch input location is selected as the representative signal. The signal from the sensor furthest away may be selected because it may represent the signal with the least amount of distortion (e.g., to prevent overcorrection). In some embodiments, determining the representative signal includes summing/averaging a plurality of received signals. A weighed summing/averaging may be performed using one or more weight values determined using a received touch input location. For example, the weights may be correlated to the distance between the touch input location and the location of the sensor that received the signal being weighted. In some embodiments, determining the representative signal is optional. For example, each received/detected audio signal is used to modify the closest proximate transmitter/transducer.

At 1208, the representative audio signal is compared with an ideal audio signal to determine a difference. In some embodiments, the ideal audio signal is an audio signal to be transmitted. For example, in a sufficiently fast processing system, the representative audio signal represents how the audio signal to be transmitted will be distorted/dampened when the audio signal to be transmitted is actually actuated on the touch input medium. In some embodiments, determining the difference includes using a signal combiner (e.g., signal combiner 1130 of FIG. 11) to subtract the representative signal from the ideal signal. For example, the determined difference represents the difference in the representative audio signal from the ideal audio signal due to a distortion/dampening of the touch input medium.

At 1210, the determined difference is used to modify a signal to be transmitted. In some embodiments, an adaptive equalizer such as equalizer 1114 of FIG. 11 receives an audio signal to be transmitted/outputted as a speaker output and receives and uses the determined difference to modify the audio signal to be transmitted. For example, the audio signal to be outputted is pre-distorted to compensate and mitigate the effect of the detected disturbance/dampening of the determined difference. In some embodiments, modifying the signal includes using a least mean squares adaptive filter/equalizer to determine an output signal with the minimum mean square error. This determined output signal may be converted to an analog signal, filtered, and amplified to be used by one or more transducers to drive/actuate a touch input medium to provide a speaker output. The process of FIG. 12 may be repeated to constantly compensate for any detected disturbance/dampening on a touch input medium being used as a speaker.

In some embodiments, a single equalizer (e.g., equalizer 1114 of FIG. 11) is utilized and the same output signal from the equalizer is provided to be outputted by a plurality of driver transducers. In some embodiments, a plurality of equalizers is utilized. For example, for each transducer used to drive/actuate a touch input medium, a different adaptive equalizer is utilized to determine a customized audio signal to be outputted by the transducer, whereby each different adaptive equalizer may utilize a different determined coefficient, a different input signal, a different determined difference such as a difference determined at 1208 (e.g., using signals detected from different sensors), and/or a different determined distance (e.g., a distance between the driver transducer and a touch input location) to determine the output signal. In some embodiments, an intensity and/or operation of a signal to be driven/actuated by a driver transducer is dynamically determined based on a distance between the driver transducer and a touch input location. For example, one or more transducers located near a touch input location may be not utilized (e.g., not provided a signal and/or power) to only utilize other less affected transducers. In another example, the amplitude/intensity of a signal to be outputted by one or more transducers located near a touch input location is increased more than other transducers that are further away to compensate for localized dampening.

Figure 13:
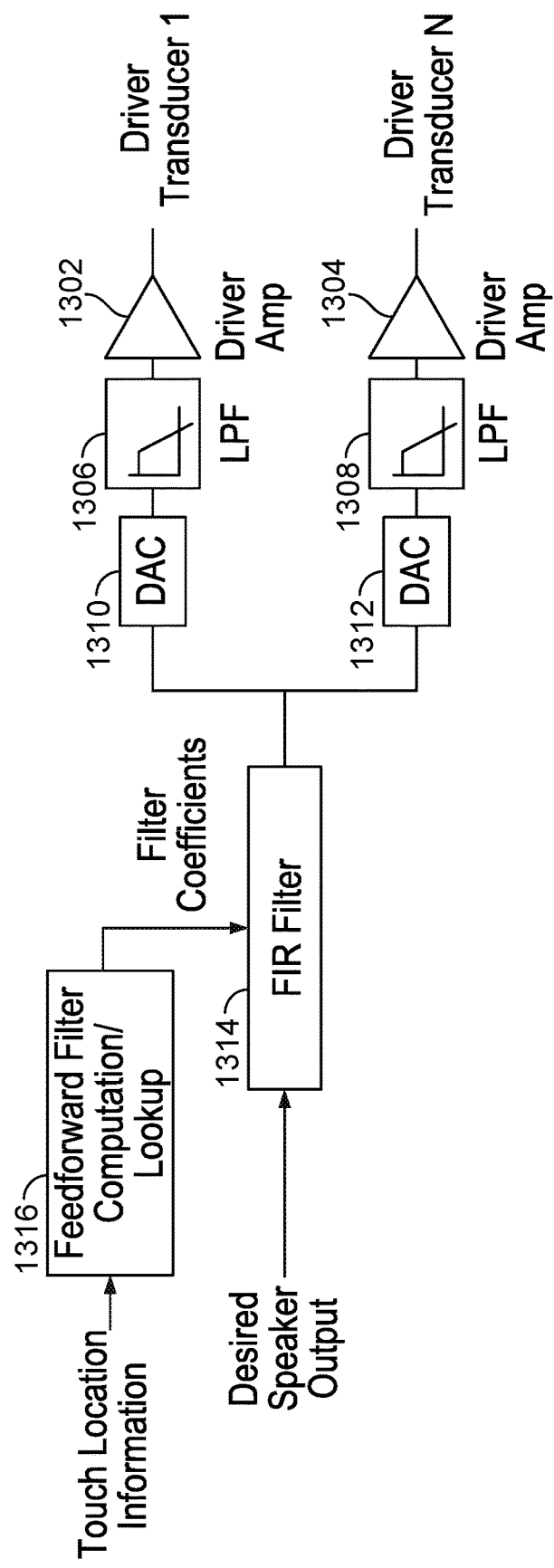
FIG. 13 is a schematic illustrating an example schematic of a predetermined data compensated speaker.
Figure 14:
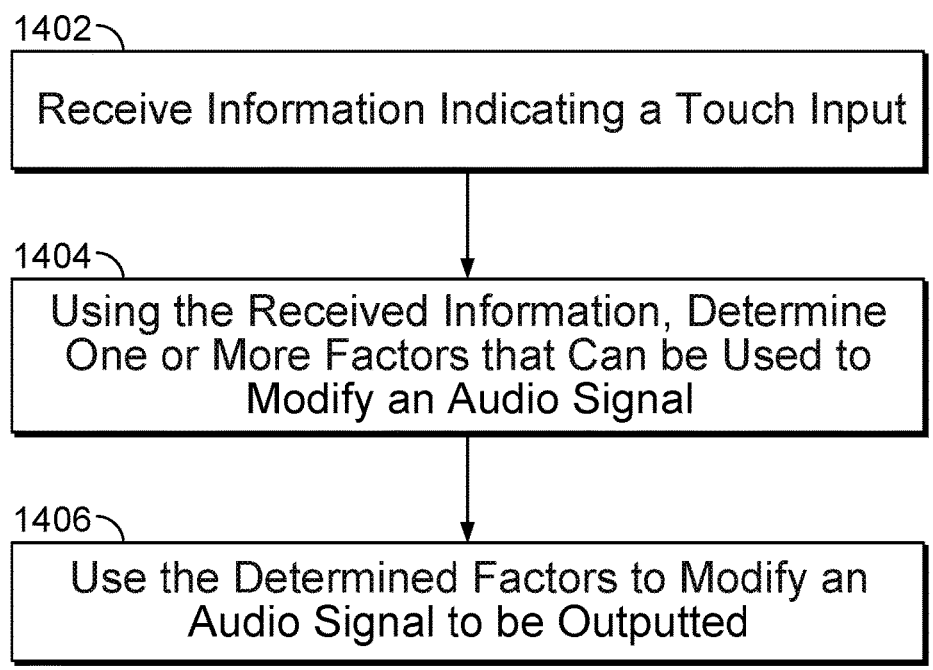
FIG. 14 is a flowchart illustrating an embodiment of a process for providing an audio output using predetermined data.

FIG. 13 is a schematic illustrating an example schematic of a predetermined data compensated speaker. In some embodiments, one or more components of FIG. 13 are included in component 120 of FIG. 1 and/or component 202 of FIG. 2. In some embodiments, at least a portion of the process of FIG. 14 is implemented by one or more components of FIG. 13. FIG. 13 shows audio signal outputs being driven from "N" number of driver transducers. For example, the driver transducers are coupled to a touch input medium such as medium 102 of FIG. 1. When the driver transducers actuate/vibrate the medium using the audio signal, the medium emits audio that is provided as a speaker output. In some embodiments, the driver transducers of FIG. 13 are one or more of the transmitters shown in FIG. 1. To simplify the example and illustrate the example clearly, only components of two driver transducers are shown in FIG. 13. Additional driver transducers may be provided an audio signal to be used to drive a touch input medium using additional components (not shown in FIG. 13) connected to filter 1314. For example, for each additional driver transducer to be utilized, additional components of an amplifier (e.g., similar to amplifier 1302 or 1304), a filter (e.g., similar to filter 1306 or 1308), and a digital to analog converter (e.g., similar to converter 1310 or 1312) are utilized. Although the example shown in FIG. 13 shows a single FIR filter (e.g., equalizer) 1314 connected to multiple converter components, in other embodiments, multiple equalizers such as multiple FIR filters may be utilized. For example, for each driver transducer, a different FIR filter may be utilized. The components shown in FIG. 13 are referenced and described throughout the specification. For example, the process of FIG. 14 describes embodiments utilizing one or more components of FIG. 13.

FIG. 14 is a flowchart illustrating an embodiment of a process for providing an audio output using predetermined data. At least a portion of the process of FIG. 14 may be implemented on component 120 of FIG. 1 and/or component 202 of FIG. 2. In some embodiments, at least a portion of the process of FIG. 14 may be implemented on one or more components of FIG. 13.

At 1402, information indicating a touch input is received. In some embodiments, the information is received at a component such as component 1316 of FIG. 13. In some embodiments, the information includes a location identifier associated with a physical location where the touch input was received. For example, the information includes a location identifier determined at 604 of FIG. 6. In some embodiments, the received information includes information associated with a plurality of touch inputs. In some embodiments, the received information includes information identifying an area associated with a touch input. In some embodiments, the received information includes information identifying a type of object used to provide the touch input (e.g., stylus, finger, etc.). In some embodiments, the received information includes information identifying a force and/or pressure of the touch input.

At 1404, using the received information, one or more factors that can be used to modify an audio signal are determined. For example, the audio signal is a signal to be outputted as a speaker output and the signal is modified to compensate for distortion/dampening of the audio signal when audio signal is actuated on a touch input medium used as a speaker. Examples of the factors include one or more of the following: a filter coefficient, an amplitude change factor, a phase change factor, a delay factor, and a frequency change factor. In some embodiments, the factors have been predetermined and stored in a data structure. For example, for each location, pressure, and type of input object, one or more factors have been predetermined using physical and/or virtual simulations. The predetermined factors may be stored in a table, a database, a list, and/or any other data structure. In some embodiments, determining the factors includes locating within the data structure the factors corresponding to the received information. For example, using a location coordinate and a pressure identifier, factors that can be used to compensate for the dampening source of the identified pressure located at the location coordinate are obtained from a database of factors. In some embodiments, the factors are dynamically determined using a simulation and/or one or more formulas. For example, at least a portion of the received information is used as inputs to a formula to dynamically compute one or more of the factors.

At 1406, the determined factors are used to modify an audio signal to be outputted. In some embodiments, a filter such as FIR filter 1314 of FIG. 13 receives an audio signal to be transmitted/actuated/outputted as a speaker output and receives and uses the determined factors to modify the audio signal to be transmitted. For example, the audio signal to be outputted is pre-distorted to compensate and mitigate the effect of a disturbance/dampening to the signal, likely to be caused by a detected touch input. In some embodiments, modifying the signal includes using the factors as filter coefficients of a finite impulse response (FIR) filter that modifies/filters the signal to be outputted. This determined output signal may be converted to an analog signal, filtered, and amplified to be used by one or more transducers to drive/actuate a touch input medium to provide a speaker output.

In some embodiments, the same determined output signal is provided to be outputted by a plurality of driver transducers. In some embodiments, the determined output signal is provided to be outputted by a single transducer. For example, for each transducer used to drive/actuate a touch input medium, a different signal modification component (e.g., FIR filter) is utilized to determine a customized audio signal to be outputted by the specific transducer. Each different signal modification component may utilize different factors determined specifically for the specific signal modification component.

In some embodiments, when the same touch input medium is used as both a microphone and a speaker as previously described, adaptive echo cancellation may be used to prevent the speaker output from feeding back into the microphone input. For example, if both speaker and microphone functionality were simultaneously enabled (e.g., in a speakerphone application), speaker output may overwhelm any desired audio signal input from the microphone.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing an audio signal, comprising:
   an interface that receives the audio signal from a sensor coupled to a touch input medium, wherein the sensor receives the audio signal via the touch input medium and the touch input medium includes a touch location input surface of a touchscreen;
   a detector that indicates an event where the touch input medium has been contacted at a location on the touch input medium, wherein the event has been captured as an audio signal component of the received audio signal;
   a processor configured to perform a joint estimation using a set of audio signal components, wherein the set includes the audio signal component of the received audio signal and performing the joint estimation includes identifying the audio signal component of the received audio signal that is to be at least in part reduced; and
   a signal modifier that reduces at least a portion of the identified audio signal component from the audio signal.

2. The system of claim 1, wherein the indication of the event is used at least in part to locate the audio signal component within the received audio signal.

3. The system of claim 2, wherein locating the audio signal component within the received audio signal includes determining a time identifier identifying a temporal location within the audio signal.

4. The system of claim 1, wherein reducing at least a portion of the audio signal component from the audio signal includes muting a portion of the audio signal that includes the audio signal component.

5. The system of claim 1, wherein reducing at least a portion of the audio signal component includes reducing an amplitude of the audio signal component within the received audio signal.

6. The system of claim 1, further comprising a threshold detector that activates a component of the system when a threshold amplitude is detected in the received audio signal.

7. The system of claim 1, wherein performing the joint estimation includes determining a joint estimation output signal that maximizes a signal-to-noise ratio when the set of audio signal components are combined.

8. The system of claim 1, wherein performing the joint estimation includes compensating for phase differences between one or more of the audio signal components in the set.

9. The system of claim 1, wherein performing the joint estimation includes temporally shifting one or more of the audio signal components in the set.

10. The system of claim 1, wherein performing the joint estimation includes compensating for amplitude differences between one or more of the audio signal components in the set.

11. The system of claim 1, wherein reducing at least a portion of the audio signal component includes subtracting from the received audio signal a resulting signal from performing the joint estimation.

12. The system of claim 1, wherein the interface receives a second audio signal from a second sensor coupled to the touch input medium.

13. The system of claim 12, wherein the indication of the event is used to determine a second audio component of the second audio signal that captured the event.

14. The system of claim 1, wherein reducing at least a portion of the audio component includes compensating for a disturbance to the audio signal caused by the contact to the touch input medium.

15. The system of claim 1, wherein a resulting signal from the signal modifier is combined with another resulting signal from a second signal modifier to determine a detected microphone audio input signal.

16. The system of claim 1, wherein the sensor includes a piezoelectric transducer.

17. The system of claim 1, wherein the interface, the detector, and the signal modifier are integrated on a single physical component.

18. A method for processing an audio signal, comprising:
   receiving the audio signal from a sensor coupled to a touch input medium, wherein the sensor receives the audio signal via the touch input medium and the touch input medium includes a touch location input surface of a touchscreen;
   receiving an indication of an event where the touch input medium has been contacted at a location on the touch input medium, wherein the event has been captured as an audio signal component of the received audio signal;
   performing a joint estimation using a set of audio signal components, wherein the set includes the audio signal component of the received audio signal and performing the joint estimation includes identifying the audio signal component of the received audio signal that is to be at least in part reduced; and using a signal modifier to reduce at least a portion of the identified audio signal component from the audio signal.

19. The method of claim 18, wherein reducing at least a portion of the audio component includes compensating for a disturbance to the audio signal caused by the contact to the touch input medium.

20. A computer program product for processing an audio signal, the computer program product being embodied in a non-transitory computer readable storage medium and comprising computer instructions for:

receiving the audio signal from a sensor coupled to a touch input medium, wherein the sensor receives the audio signal via the touch input medium and the touch input medium includes a touch location input surface of a touchscreen;

receiving an indication of an event where the touch input medium has been contacted at a location on the touch input medium, wherein the event has been captured as an audio signal component of the received audio signal;

performing a joint estimation using a set of audio signal components, wherein the set includes the audio signal component of the received audio signal and performing the joint estimation includes identifying the audio signal component of the received audio signal that is to be at least in part reduced; and reducing at least a portion of the identified audio signal component from the audio signal.

* * * * *